United States Patent
Ishikawa et al.

(10) Patent No.: US 6,403,512 B1
(45) Date of Patent: Jun. 11, 2002

(54) DIELECTRIC CERAMIC FOR HIGH FREQUENCY, DIELECTRIC RESONATOR, DIELECTRIC FILTER, DIELECTRIC DUPLEXER AND COMMUNICATION UNIT

(75) Inventors: Tatsuya Ishikawa, Yokaichi; Hitoshi Takagi, Omihachiman, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/902,836

(22) Filed: Jul. 11, 2001

(30) Foreign Application Priority Data

Jul. 12, 2000 (JP) ......................................... 2000-211612

(51) Int. Cl.[7] ......................... C04B 35/465; H01P 1/20; H01P 7/10; H04B 1/38
(52) U.S. Cl. .................. 501/136; 333/219.1; 455/73
(58) Field of Search .................... 501/136; 333/219.1; 455/73

(56) References Cited

U.S. PATENT DOCUMENTS 5,824,616 A * 10/1998 Kagata et al. ............... 501/136

FOREIGN PATENT DOCUMENTS

| EP | 1013624 A2 | 6/2000 |
| JP | 58-25068 | 5/1983 |
| JP | 61-10806 | 1/1986 |
| JP | 3-34164 | 5/1991 |
| JP | 4-118807 | 4/1992 |
| JP | 4-59267 | 9/1992 |
| JP | 10-95663 | 4/1998 |

OTHER PUBLICATIONS

Database WPI; Section Ch, Week 200066; Derwent Publications Ltd.; London, G.B.; Class L03, AN 2000–234724; XP002180716 & KR 208 479 B (Korea Adv Ins. Sci & Technology); (Jul. 15, 1999); Abstract.

"Microwave Dielectric Properties of $CaTiO_3$–$Ca(Al_{1/2}Ta_{1/2})O_3$ Ceramics"; S. Kucheiko, et al.; *J. Am. Ceram. Soc.*; 79 [10] 2739–43; (1996.) No month provided.

* cited by examiner

Primary Examiner—David Brunsman
(74) Attorney, Agent, or Firm—Dickstein Shapiro Morin & Oshinsky LLP

(57) ABSTRACT

A dielectric ceramic for high frequency having a composition represented by the formula:
$yCaTi_aO_{1+2a}$–$(1-y)xCa\{(Mg_zZn_{1-z})_{1/3}Nb_{2/3}\}_bO_{1+2b}$–$(1-y)(1-x)Ca(Al_{1/2}Nb_{1/2})_cO_{1+2c}$ wherein $(1-y)x \leq 0.340$; $0 < x \leq 0.600$; $0.380 \leq y \leq 0.570$; $0 \leq z \leq 1.000$; $0.980 \leq a \leq 1.050$; $0.980 \leq b \leq 1.050$; and $0.980 \leq c \leq 1.050$, and comprising a perovskite crystal phase as the main crystal is provided. It has a large specific dielectric constant of from about 40 to 60, a large Q value (at 1 GHz) of about 25,000 or more and a temperature coefficient of resonant frequency which can be controlled within the range of about $0 \pm 30$ (ppm/° C.). Part of the Nb may be replaced with Ta.

20 Claims, 1 Drawing Sheet

DIELECTRIC CERAMIC FOR HIGH FREQUENCY, DIELECTRIC RESONATOR, DIELECTRIC FILTER, DIELECTRIC DUPLEXER AND COMMUNICATION UNIT

BACKGROUND OF THE INVENTION

1. Field of the Invention

The present invention relates to a dielectric ceramic utilizable for a high frequency region such as the microwave region and the millimeter wave region, as well as a dielectric resonator, a dielectric filter, a dielectric duplexer and a communication unit using the ceramic.

2. Description of the Related Art

Dielectric ceramics are widely used as materials for a dielectric resonator, a dielectric filter and a circuit board mounted on an electronic devices which are utilized in high frequency regions such as the microwave region and the millimeter wave region for various applications including portable telephones, personal wireless sets and satellite broadcast receivers, for example.

As the dielectric characteristics required for such a dielectric ceramic for high frequency, enumerated are: (1) a large specific dielectric coefficient ($\in_r$) for meeting the requirement of miniaturization since the wavelength of an electromagnetic wave is shortened by $1/(\in_r)^{1/2}$ in a dielectric; (2) a small dielectric loss, that is, a large Q value; (3) excellent temperature stability of resonant frequency, that is, the temperature coefficient ($\tau_f$) of resonant frequency being in the vicinity of 0 (ppm/° C.), etc.

Conventionally, dielectric ceramics represented by such as a $Ba(Zn,Ta)O_3$-type composition, (Japanese Examined Patent Application Publication No. 58-25068), a $Ba(Sn,Mg,Ta)O_3$-type composition (Japanese Examined Patent Application Publication No. 3-34164), a $(Zr,Sn)TiO_4$-type composition (Japanese Examined Patent Application Publication No. 4-59267), and a $Ba_2Ti_9O_{20}$ composition (Japanese Unexamined Patent Application Publication No. 61-10806), are known.

However, while the $Ba(Zn,Ta)O_3$-type and $Ba(Sn,Mg,Ta)O_3$-type materials have very large Q values (at 1 GHz) ranging from 150,000 to 300,000, the specific dielectric constants ($\in_r$) are relatively small, ranging from 24 to 30.

On the other hand, the $(Zr,Sn)TiO_4$-type and $Ba_2Ti_9O_{20}$-type materials have relatively large specific dielectric constants ($\in_r$) of from 37 to 40, and large Q values (at 1 GHz) of from 50,000 to 60,000. However, it is difficult to realize a larger specific dielectric constant ($\in_r$), for example, to realize a value over 40.

In recent years, the requirements of reduction in loss and miniaturization for electronic devices have been increased. Accordingly, requirements for developing dielectric materials which have further excellent dielectric characteristics, especially both a large specific dielectric constant ($\in_r$) and a large Q value, have been increased. However, the present technologies cannot meet these requirements fully.

SUMMARY OF THE INVENTION

Hereupon, one of the objects of the present invention is to provide a dielectric ceramic for high frequency which has a large specific dielectric constant ($\in_r$) of from 40 to 60, a large Q value (at 1 GHz) of about 25,000 or more, and a temperature coefficient ($\tau_f$) of resonant frequency which can be controlled within the range of about 0±30 (ppm/° C.). Another object is to provide a dielectric resonator, a dielectric filter, a dielectric duplexer and a communication unit using the ceramic.

To achieve the above-described objects, a dielectric ceramic for high frequency according to the present invention is characterized by comprising Ca, Ti, Mg, Zn, Nb and Al, by having a constitution represented by the formula: $yCaTi_aO_{1+2a}-(1-y)xCa\{(Mg_zZn_{1-z})_{1/3}Nb_{2/3}\}_bO_{1+2b}-(1-y)(1-x)Ca(Al_{1/2}Nb_{1/2})_cO_{1+2c}$ (where x and y are each a molar ratio), wherein α, x, y, z, a, b and c are in the ranges of the following formulae α=(1−y)x: α≦0.340; 0<x≦0.600; 0.380≦y≦0.570; 0≦z≦1.000; 0.980≦a≦1.050; 0.980≦b≦1.050; and 0.980≦c≦1.050, and by comprising a perovskite crystal phase as a main crystal.

Another dielectric ceramic for high frequency according to the present invention is characterized in that it is obtained by further including Ta in the above-described dielectric ceramic for high frequency, and it has a constitution represented by the formula: $yCaTi_aO_{1+2a}-(1-y)xCa\{(Mg_zZn_{1-z})_{1/3}(Nb_dTa_{1-d})_{2/3}\}_bO_{1+2b}-(1-y)(1-x)Ca\{Al_{1/2}(Nb_dTa_{1-d})_{1/2}\}_cO_{1+2c}$ (where x and y are each a molar ratio), wherein α, x, y, z, a, b, c and d are in the ranges of the following formulae α=(1−y)x: α≦0.340; 0<x≦0.600; 0.380≦y≦0.570; 0≦z≦1.000; 0.980≦a≦1.050; 0.980≦b≦1.050; 0.980≦c≦1.050; and 0<d<1.000.

In each above-described dielectric ceramic for high frequency, the symbols a and b are preferably within the following ranges: 1.000≦a≦1.050; and 0.980≦b≦1.000.

Furthermore, a dielectric resonator according to the present invention is characterized by having a dielectric ceramic actuated by electromagnetic coupling with the input/output terminals, wherein the dielectric ceramic is composed of the above-described dielectric ceramic for high frequency.

Furthermore, a dielectric filter according to the present invention is characterized in that it comprises an outer coupling as well as the above-described dielectric resonator.

Furthermore, a dielectric duplexer according to the present invention is characterized by comprising at least two dielectric filters, input/output connection connected to each of the dielectric filters, and an antenna connection connected commonly to the dielectric filters, wherein at least one of the above-described dielectric filters is the dielectric filter described above in the previous paragraph.

Furthermore, a communication unit according to the present invention is characterized by comprising the above-described dielectric duplexer, a transmission circuit connected to at least one of the input/output connections of the dielectric duplexer, a receiving circuit connected to at least one of the input/output connection which is different from the above-described input/output connection connected to the transmission circuit, and an antenna connected to the antenna connection of the dielectric duplexer.

DESCRIPTION OF THE PREFERRED EMBODIMENTS

Although the present invention is described with reference to the following figures and examples, it is to be understood that the invention is not limited to the precise embodiments described below.

Figure 1:
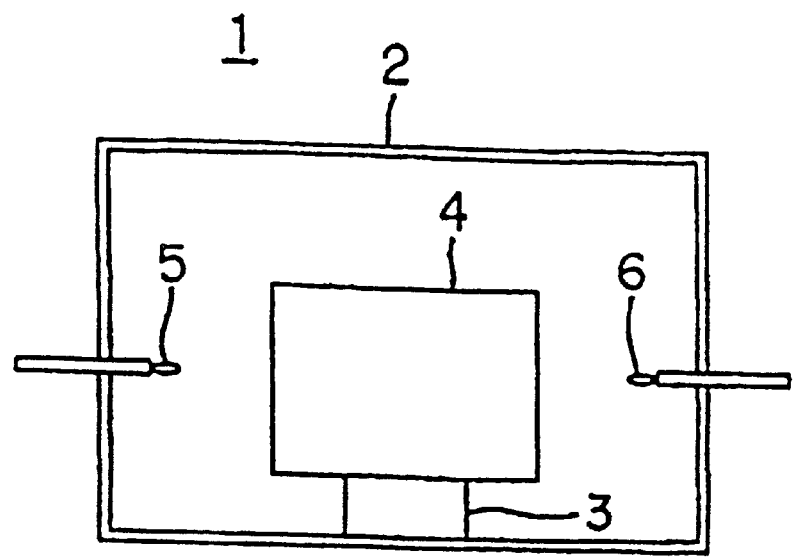
FIG. 1 is a cross-sectional view illustrating a dielectric resonator according to an embodiment of the present invention.

FIG. 1 is a cross-sectional view illustrating the fundamental structure of a dielectric resonator 1 according to an embodiment of the present invention.

Referring to FIG. 1, the dielectric resonator 1 has a metal case 2. In the inner space of the metal case 2, a pillar-shaped dielectric ceramic 4 is supported by a support 3. In addition, an input terminal 5 and an output terminal 6 are held by the metal case 2 and are isolated from the metal case 2. The dielectric ceramic 4 is actuated by electromagnetic coupling with the input terminal 5 and the output terminal 6, through which only the signals at a specific frequency among those inputted from the input terminal 5 are outputted at the output terminal 6. The dielectric ceramic 4 in the dielectric resonator 1 is composed of a dielectric ceramic for high frequency according to the present invention.

The dielectric resonator in FIG. 1 is a TE01δ mode dielectric resonator. It is noted, however, that the dielectric ceramic for high frequency according to the present invention can also be used for other dielectric resonators of various types such as TE mode, TM mode and TEM mode.

Figure 2:
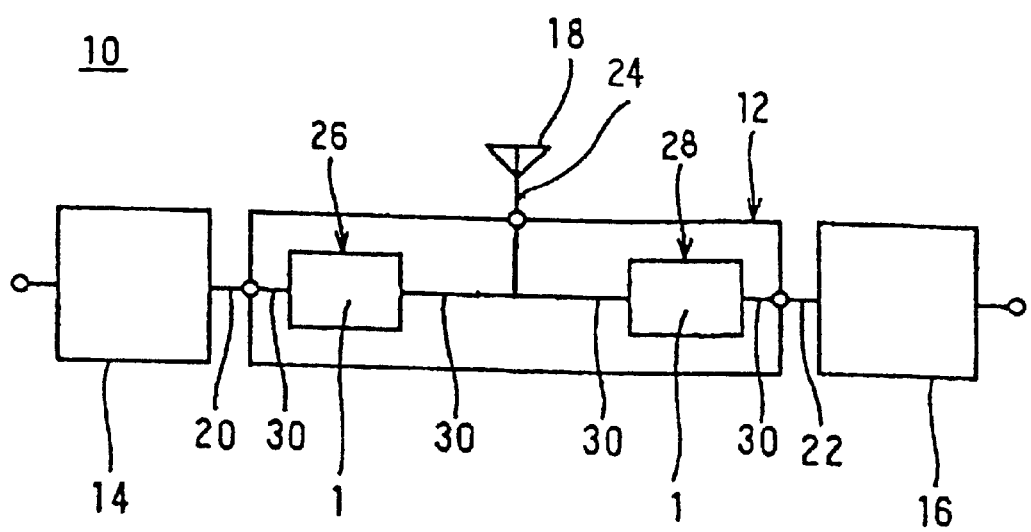
FIG. 2 is a block diagram showing one example of a communication unit according to the present invention.

FIG. 2 is a block diagram showing an example of a communication unit according to the present invention. This communication unit 10 comprises a dielectric duplexer 12, a transmission circuit 14, a receiving circuit 16 and an antenna 18. The transmission circuit 14 is connected to an input connector 20 of the dielectric duplexer 12, and the receiving circuit 16 is connected to an output connector 22 of the dielectric duplexer 12. The antenna 18 is connected to an antenna connector 24 of the dielectric duplexer 12. This dielectric duplexer 12 comprises two dielectric filters 26 and 28. The dielectric filters 26 and 28 are formed by connecting the dielectric resonators according to the present invention to outer coupling. In this example, they are formed by connecting the input/output terminals of the dielectric resonators 1 with the outer coupling 30, respectively. Accordingly, the dielectric filter 26 is located between the input connector 20 and the other dielectric filter 28 to connect them, and the other dielectric filter 28 is located between the dielectric filter 26 and the output connector 22 to connect them.

The dielectric ceramic for high frequency according to the present invention comprises Ca, Ti, Mg, Zn, Nb and Al as described above, and has a constitution represented by the formula:

$yCaTi_aO_{1+2a}-(1-y)xCa\{(Mg_zZn_{1-z})_{1/3}Nb_{2/3}\}_bO_{1+2b}-(1-y)(1-x)Ca(Al_{1/2}Nb_{1/2})_cO_{1+2c}$ (where x and y are each a molar ratio), wherein α, x, y, z, a, b, and c are in the ranges of the following formulae respectively, when α=(1−y)x.

First, $0<x\leq 0.600$. This is because the Q value is less than 25,000 when either x=0 or x>0.600.

As to $0.380\leq y\leq 0.570$. This is because the temperature coefficient ($\tau_f$) of resonant frequency is out of the range of about 0±30 ppm/° C. when either y<0.380 or y>0.570.

As to α, $\alpha\leq 0.340$. This is because the Q value is less than 25,000 or the temperature coefficient ($\tau_f$) of resonant frequency is shifted toward the more minus side of −30 ppm/° C. when α>0.340.

As to a, $0.980\leq a\leq 1.050$. This is because the Q value is less than 25,000 when a<0.980 or a>1.050. It is preferable that the formula is: $1.000\leq a\leq 1.050$ since a higher Q value is obtained.

As to b, $0.980\leq b\leq 1.050$. This is because the Q value is less than 25,000 when b≦0.980 or b>1.050. It is preferable that the formula is: $0.980\leq b\leq 1.000$ since a higher Q value is obtained.

Regarding c, $0.980\leq c\leq 1.050$. This is because the Q value is less than 25,000 when c<0.980 or c>1.050.

It is noted that excellent properties such as a specific dielectric constant ($\epsilon_r$) of 40 or more, a Q value of 25,000 or more and a temperature coefficient ($\tau_f$) of resonant frequency within the range of about 0±30 ppm/° C., can be provided by replacing part of Nb of the above-described formula with Ta.

EXAMPLES

Next, the present invention will be explained, based on the more concrete examples.

Example 1

As the starting materials, high-purity calcium carbonate ($CaCO_3$), titanium oxide ($TiO_2$), magnesium hydroxide ($Mg(OH)_2$), zinc oxide (ZnO), niobium oxide ($Nb_2O_5$) and aluminum oxide ($Al_2O_3$) were prepared.

Next, these materials were compounded to form ceramics having constitutions represented by the formula: $yCaTi_aO_{1+2a}-(1-y)xCa\{(Mg_zZn_{1-z})_{1/3}Nb_{2/3}\}_bO_{1+2b}-(1-y)(1-x)Ca(Al_{1/2}Nb_{1/2})_cO_{1+2c}$ (where x and y are each a molar ratio), as shown on top of Tables 1 and 2.

TABLE 1

$yCaTi_aO_{1+2a}-(1-y)xCa\{Mg_zZn_{1-z})_{1/3}Nb_{2/3}\}_bO_{1+2b}-(1-y)(1-x)Ca(Al_{1/2}Nb_{1/2})_cO_{1+2c}$

| Sample No. | x | y | z | α = (1 − y)x | a | b | c | $\epsilon_r$ | Q value (at 1 GHz) | $\tau_f$ (ppm/° C.) |
|---|---|---|---|---|---|---|---|---|---|---|
| *1 | 0 | 0.400 | 1.000 | 0 | 1.000 | 1.000 | 1.000 | 33.2 | 18,500 | −38.5 |
| *2 | 0 | 0.450 | 1.000 | 0 | 1.000 | 1.000 | 1.000 | 40.2 | 20,600 | −21.5 |
| *3 | 0 | 0.500 | 1.000 | 0 | 1.000 | 1.000 | 1.000 | 45.6 | 23,800 | 3.5 |
| *4 | 0 | 0.550 | 1.000 | 0 | 1.000 | 1.000 | 1.000 | 49.3 | 22,800 | 26.5 |
| 5 | 0.100 | 0.480 | 1.000 | 0.052 | 1.000 | 1.000 | 1.000 | 44.8 | 30,200 | −6.9 |
| 6 | 0.100 | 0.500 | 1.000 | 0.050 | 1.000 | 1.000 | 1.000 | 46.6 | 29,600 | 3.5 |
| 7 | 0.100 | 0.550 | 1.000 | 0.045 | 1.000 | 1.000 | 1.000 | 50.4 | 28,300 | 24.4 |
| *8 | 0.100 | 0.600 | 1.000 | 0.040 | 1.000 | 1.000 | 1.000 | 53.4 | 23,700 | 37.7 |
| 9 | 0.200 | 0.450 | 1.000 | 0.110 | 1.000 | 1.000 | 1.000 | 43.5 | 33,700 | −17.3 |
| 10 | 0.200 | 0.500 | 1.000 | 0.100 | 1.000 | 1.000 | 1.000 | 47.5 | 31,800 | 4.1 |
| 11 | 0.200 | 0.550 | 1.000 | 0.090 | 1.000 | 1.000 | 1.000 | 51.5 | 30,000 | 25.4 |
| *12 | 0.200 | 0.600 | 1.000 | 0.080 | 1.000 | 1.000 | 1.000 | 55.5 | 28,100 | 46.8 |
| *13 | 0.300 | 0.300 | 1.000 | 0.210 | 1.000 | 1.000 | 1.000 | 31.5 | 46,700 | −74 |
| 14 | 0.300 | 0.400 | 1.000 | 0.180 | 1.000 | 1.000 | 1.000 | 40.2 | 40,900 | −29.7 |
| 15 | 0.300 | 0.500 | 1.000 | 0.150 | 1.000 | 1.000 | 1.000 | 48.8 | 35,200 | 7.2 |
| *16 | 0.300 | 0.600 | 1.000 | 0.120 | 1.000 | 1.000 | 1.000 | 57.5 | 29,400 | 47.8 |
| *17 | 0.400 | 0.340 | 1.000 | 0.264 | 1.000 | 1.000 | 1.000 | 37.3 | 44,800 | −46.9 |
| 18 | 0.400 | 0.400 | 1.000 | 0.240 | 1.000 | 1.000 | 1.000 | 41.5 | 41,300 | −27.3 |

TABLE 1-continued $yCaTi_aO_{1+2a}$—$(1-y)xCa\{Mg_zZn_{1-z})_{1/3}Nb_{2/3}\}_bO_{1+2b}$—$(1-y)(1-x)Ca(Al_{1/2}Nb_{1/2})_cO_{1+2c}$

| Sample No. | x | y | z | α = (1 − y)x | a | b | c | $\epsilon_r$ | Q value (at 1 GHz) | $\tau_f$ (ppm/° C.) |
|---|---|---|---|---|---|---|---|---|---|---|
| 19 | 0.400 | 0.450 | 1.000 | 0.220 | 1.000 | 1.000 | 1.000 | 45.8 | 37,900 | −7.7 |
| 20 | 0.400 | 0.500 | 1.000 | 0.200 | 1.000 | 1.000 | 1.000 | 50.0 | 34,500 | 11.9 |
| 21 | 0.400 | 0.550 | 1.000 | 0.180 | 1.000 | 1.000 | 1.000 | 54.3 | 30,900 | 29.8 |
| *22 | 0.500 | 0.340 | 1.000 | 0.330 | 1.000 | 1.000 | 1.000 | 41.0 | 44,800 | −32.2 |
| 23 | 0.500 | 0.450 | 1.000 | 0.275 | 1.000 | 1.000 | 1.000 | 47.0 | 38,100 | −5.4 |
| 24 | 0.500 | 0.500 | 1.000 | 0.250 | 1.000 | 1.000 | 1.000 | 51.0 | 34,900 | 14.1 |
| *25 | 0.500 | 0.600 | 1.000 | 0.200 | 1.000 | 1.000 | 1.000 | 60.9 | 28,800 | 68 |
| *26 | 0.600 | 0.300 | 1.000 | 0.420 | 1.000 | 1.000 | 1.000 | 38.8 | 41,500 | −48.2 |
| *27 | 0.600 | 0.350 | 1.000 | 0.390 | 1.000 | 1.000 | 1.000 | 41.4 | 38,600 | −35.5 |
| 28 | 0.600 | 0.450 | 1.000 | 0.330 | 1.000 | 1.000 | 1.000 | 47.9 | 32,800 | −0.2 |
| 29 | 0.600 | 0.500 | 1.000 | 0.300 | 1.000 | 1.000 | 1.000 | 51.9 | 30,000 | 20.5 |
| *30 | 0.600 | 0.600 | 1.000 | 0.240 | 1.000 | 1.000 | 1.000 | 61.2 | 24,300 | 73.7 |
| *31 | 0.700 | 0.300 | 1.000 | 0.490 | 1.000 | 1.000 | 1.000 | 40.2 | 31,000 | −34.3 |
| *32 | 0.700 | 0.400 | 1.000 | 0.420 | 1.000 | 1.000 | 1.000 | 45.9 | 23,000 | −9.6 |
| *33 | 0.700 | 0.500 | 1.000 | 0.350 | 1.000 | 1.000 | 1.000 | 53.3 | 20,000 | 25.9 |
| *34 | 0.500 | 0.300 | 0 | 0.350 | 1.000 | 1.000 | 1.000 | 42.7 | 47,000 | −31.5 |
| 35 | 0.500 | 0.380 | 0 | 0.310 | 1.000 | 1.000 | 1.000 | 46.2 | 38,900 | −22.2 |
| 36 | 0.500 | 0.450 | 0 | 0.270 | 1.000 | 1.000 | 1.000 | 50.6 | 33,200 | −3.2 |
| 37 | 0.500 | 0.500 | 0 | 0.250 | 1.000 | 1.000 | 1.000 | 54.5 | 30,200 | 16.5 |
| *38 | 0.500 | 0.580 | 0 | 0.210 | 1.000 | 1.000 | 1.000 | 61.9 | 26,500 | 58.7 |
| *39 | 0.600 | 0.380 | 0 | 0.372 | 1.000 | 1.000 | 1.000 | 46.9 | 33,800 | −35.0 |
| 40 | 0.600 | 0.450 | 0 | 0.330 | 1.000 | 1.000 | 1.000 | 51.6 | 31,600 | 3.6 |
| 41 | 0.600 | 0.500 | 0 | 0.300 | 1.000 | 1.000 | 1.000 | 55.4 | 29,500 | 23.6 |
| *42 | 0.600 | 0.600 | 0 | 0.240 | 1.000 | 1.000 | 1.000 | 64.3 | 23,600 | 78.2 |
| *43 | 0.700 | 0.300 | 0 | 0.490 | 1.000 | 1.000 | 1.000 | 43.8 | 24,700 | −28.2 |
| *44 | 0.700 | 0.400 | 0 | 0.420 | 1.000 | 1.000 | 1.000 | 49.4 | 24,500 | −5.5 |
| *45 | 0.700 | 0.500 | 0 | 0.350 | 1.000 | 1.000 | 1.000 | 56.5 | 19,600 | 30.7 |
| 46 | 0.500 | 0.460 | 0.500 | 0.270 | 1.000 | 1.000 | 1.000 | 49.6 | 35,000 | 1.4 |
| 47 | 0.600 | 0.450 | 0.500 | 0.330 | 1.000 | 1.000 | 1.000 | 49.5 | 34,500 | 1.5 |

TABLE 2

$yCaTi_aO_{1+2a}$—$(1-y)xCa\{Mg_zZn_{1-z})_{1/3}Nb_{2/3}\}_bO_{1+2b}$—$(1-y)(1-x)Ca(Al_{1/2}Nb_{1/2})_cO_{1+2c}$

| Sample No. | x | y | z | α = (1 − y)x | a | b | c | $\epsilon_r$ | Q value (at 1 GHz) | $\tau_f$ (ppm/° C.) |
|---|---|---|---|---|---|---|---|---|---|---|
| *48 | 0.600 | 0.500 | 1.000 | 0.300 | 0.950 | 1.000 | 1.000 | 50.9 | 20,000 | 18.0 |
| 49 | 0.600 | 0.500 | 1.000 | 0.300 | 0.980 | 1.000 | 1.000 | 51.5 | 25,200 | 19.5 |
| 50 | 0.600 | 0.500 | 1.000 | 0.300 | 1.050 | 1.000 | 1.000 | 52.3 | 28,500 | 21.0 |
| *51 | 0.600 | 0.500 | 1.000 | 0.300 | 1.080 | 1.000 | 1.000 | 52.8 | 21,200 | 22.2 |
| *52 | 0.600 | 0.500 | 1.000 | 0.300 | 1.000 | 0.950 | 1.000 | 51.6 | 22,500 | 20.2 |
| 53 | 0.600 | 0.500 | 1.000 | 0.300 | 1.000 | 0.980 | 1.000 | 51.8 | 28,600 | 20.4 |
| 54 | 0.600 | 0.500 | 1.000 | 0.300 | 1.000 | 1.050 | 1.000 | 52.0 | 25,500 | 20.6 |
| *55 | 0.600 | 0.500 | 1.000 | 0.300 | 1.000 | 1.080 | 1.000 | 52.1 | 20,900 | 20.6 |
| *56 | 0.600 | 0.500 | 1.000 | 0.300 | 1.000 | 1.000 | 0.950 | 51.8 | 21,500 | 20.3 |
| 57 | 0.600 | 0.500 | 1.000 | 0.300 | 1.000 | 1.000 | 0.980 | 51.9 | 28,300 | 20.4 |
| 58 | 0.600 | 0.500 | 1.000 | 0.300 | 1.000 | 1.000 | 1.050 | 51.9 | 28,900 | 20.5 |
| *59 | 0.600 | 0.500 | 1.000 | 0.300 | 1.000 | 1.000 | 1.080 | 52.0 | 23,500 | 20.6 |

It is noted that Samples 48 to 59 shown in Table 2 are those obtained by changing the values of a, b and c for the composition of Sample 29 in Table 1.

Next, these raw material powders which had been prepared were subjected to wet grinding for 16 hours with a ball mill. After that, they were dehydrated, dried and then calcined at from 1,100 to 1,300° C. for three hours. Appropriate amounts of binders were added to the calcined powders and the mixtures were subjected again to wet grinding with a ball mill for 16 hours to form sample powders for experiments.

Next, the sample powders thus obtained were subjected to press molding at a pressure of from 1,000 to 2,000 kg/cm² to form disks. Then, they were baked at a temperature of from 1,400 to 1,600° C. in the atmosphere for 4 to 24 hours to obtain ceramics with a diameter of 10 mm and a thickness of 5 mm, comprising a perovskite crystal phase as the main crystal phase.

The specific dielectric constants ($\epsilon_r$) and the Q values in a frequency range for measurement of from 6 to 8 GHz were measured according to the dual-end short-circuited type dielectric resonator method, and the Q values converted to those at 1 GHz according to the rule: Q×f=constant. Also, the temperature coefficients ($\tau_f$) of resonant frequency in the range of from 25 to 50° C. were measured from the TE01δ mode resonator frequencies. The results are shown in Tables 1 and 2. In the Tables 1 and 2, those of sample numbers with an asterisk are out of the scope of the present invention.

From Tables 1 and 2, it is evident that the samples within the range of the present invention can provide large Q values while maintaining large specific dielectric constant values ($\epsilon_r$) in the microwave region.

Referring to Tables 1 and 2, the reasons for specifying the symbols for the formula:
$yCaTi_aO_{1+2a}-(1-y)xCa\{(Mg_zNn_{1-z})_{1/3}Nb_{2/3}\}_bO_{1+2b}-(1-y)(1-x)Ca(Al_{1/2}Nb_{1/2})_cO_{1+2c}$ according to the present invention, will be explained as follows.

First, the symbol x is specified as: $0<x\leq 0.600$. This is because the Q value is less than 25,000 when x=0, as shown in Samples 1, 2, 3 and 4. This is also because the Q value (at 1 GHz) is less than 25,000 in the region where the absolute value of the temperature coefficient ($\tau_f$) of resonant frequency is small when x>0.600, as shown in Samples 32, 33, 44 and 45.

The symbol y is specified as: $0.380\leq y\leq 0.570$. This is because the temperature coefficient ($\tau_f$) of resonant frequency is shifted greatly toward the more minus side of −30 ppm/° C. when y<0.380, as shown in Samples 13, 17, 22, 26, 27 and 34. This is also because the temperature coefficient ($\tau_f$) of resonant frequency is larger than +30 ppm/° C. when y>0.570, as shown in Samples 8, 12, 16, 25, 30, 38 and 42.

The symbol α is specified as: $\alpha\leq 0.340$. This is because the temperature coefficient ($\tau_f$) of resonant frequency is shifted toward the more minus side of −30 ppm/° C. when α>0.340, as shown in Sample 39.

The symbol a is specified as: $0.980\leq a\leq 1.050$. This is because the Q value is less than 25,000 when a<0.980, as shown in Sample 48. This is also because the Q value is less than 25,000 when a>1.050, as shown in Sample 51. Furthermore, it is preferable to specify the symbol a as: $1.000\leq a\leq 1.050$ since a Q value more than 28,000 can be obtained as shown in Sample 50.

The symbol b is specified as: $0.980\leq b\leq 1.050$. This is because the Q value is less than 25,000 when b<0.980, as shown in Sample 52. This is also because the Q value is less than 25,000 when b>1.050, as shown in Sample 55. It is preferable to specify the symbol a as: $0.980\leq a\leq 1.000$ since a Q value more than 28,000 can be obtained as shown in Sample 53.

The symbol c is specified as: $0.980\leq c\leq 1.050$. This is because the Q value is less than 25,000 when c<0.980, as shown in Sample 56. This is also because the Q value is less than 25,000 when c>1.050, as shown in Sample 59.

EXAMPLE 2

As the starting materials, high-purity calcium carbonate ($CaCO_3$), titanium oxide ($TiO_2$), magnesium hydroxide ($Mg(OH)_2$), niobium oxide ($Nb_2O_5$), aluminum oxide ($Al_2O_3$) and tantalum oxide ($Ta_2O_5$) were prepared.

Next, these raw materials were compounded to form ceramic having compositions represented by the formula:
$yCaTi_aO_{1+2a}-(1-y)xCa\{(Mg_zZn_{1-z})_{1/3}(Nb_dTa_{1-d})_{2/3}\}_bO_{1+2b}-(1-y)(1-x)Ca\{Al_{1/2}(Nb_dTa_{1-d})_{1/2}\}_cO_{1+2c}$ as is shown on top of Table 3. These ceramics are obtained by replacing part of the Nb with Ta in the ceramics shown in Example 1 which are also within the range of the present invention.

TABLE 3

$yCaTi_aO_{1+2a}-(1-y)xCa\{(Mg_zZn_{1-z})_{1/3}(Nb_dTa_{1-d})_{2/3}\}_bO_{1+2b}-(1-y)(1-x)Ca\{Al_{1/2}(Nb_dTa_{1-d})_{1/2}\}_cO_{1+2c}$

| Sample No. | d | x | y | z | α = (1 − y)x | a | b | c | $\epsilon_r$ | Q value (at 1 GHz) | $\tau_f$ (ppm/° C.) |
|---|---|---|---|---|---|---|---|---|---|---|---|
| 60 | 0.500 | 0.500 | 0.400 | 1.000 | 0.300 | 1.000 | 1.000 | 1.000 | 40.5 | 37,800 | −29.8 |
| 61 | 0.500 | 0.500 | 0.450 | 1.000 | 0.275 | 1.000 | 1.000 | 1.000 | 42.4 | 33,400 | −17.8 |
| 62 | 0.500 | 0.500 | 0.500 | 1.000 | 0.250 | 1.000 | 1.000 | 1.000 | 46.3 | 28,900 | 2.2 |
| 63 | 0.500 | 0.500 | 0.550 | 1.000 | 0.225 | 1.000 | 1.000 | 1.000 | 50.9 | 28,300 | 27.6 |
| 64 | 0.800 | 0.500 | 0.500 | 1.000 | 0.250 | 1.000 | 1.000 | 1.000 | 48.9 | 23,500 | 8.2 |
| 65 | 0.300 | 0.500 | 0.500 | 1.000 | 0.250 | 1.000 | 1.000 | 1.000 | 43.2 | 28,900 | −0.8 |
| 66 | 0.100 | 0.500 | 0.500 | 1.000 | 0.250 | 1.000 | 1.000 | 1.000 | 41.5 | 28,100 | −3.1 |
| *67 | 0.000 | 0.500 | 0.500 | 1.000 | 0.250 | 1.000 | 1.000 | 1.000 | 40.0 | 24,100 | −8.6 |

Next, ceramics comprising a perovskite crystal phase as a main crystal were prepared from the raw material powders thus obtained according to the same process as that of Example 1. Then the specific dielectric constants ($\epsilon_r$), the Q values and the temperature coefficients ($\tau_f$) of resonant frequency were measured in the same way as in Example 1. The results are shown in Table 3.

As is evident from Samples 60 to 66 in Table 3, by replacing part of the Nb with Ta, excellent properties were realized including a specific dielectric constants ($\epsilon_r$) of 40 or more, Q values of 25,000 or more and temperature coefficients ($\tau_f$) of resonant frequency within the range of 0±30 ppm/° C., although the specific dielectric constants ($\epsilon_r$) and the Q values were somewhat smaller than those of the samples without replacement of the Nb with Ta. However, if all of the Nb is replaced with Ta, the Q value will be less than 25,000 as shown in Sample 67.

It is noted that a minute amount of an additive can be added to the dielectric ceramic for high frequency according to the present invention, as long as it does not damage the objects of the present invention. For example, the baking temperature can be lowered by 20 to 30° C. without degrading the properties by adding from about 0.01% to 1.0% by weight of an additive such as $SiO_2$, $MnCO_3$, $B_2O_3$, NiO, CuO, $Li_2CO_3$, $Pb_3O_4$, $Bi_2O_3$, $V_2O_5$ or $WO_3$. Furthermore, addition of from about 1% to 3% by weight of $BaCO_3$, various rare earth compounds, etc. makes it possible to finely control the specific dielectric constant ($\epsilon_r$) and the temperature properties, providing excellent dielectric ceramics.

From the explanation as described above, it is evident that a dielectric ceramic for high frequency can be obtained according to the present invention, which has a large specific dielectric constant ($\epsilon_r$) of from 40 to 60, a large Q value (at 1 GHz) of 25,000 or more and a temperature coefficient ($\tau_f$) of resonant frequency which can be controlled within the range of 0±30 (ppm/° C.).

Accordingly, when a dielectric ceramic having such a composition is used for manufacturing a dielectric resonator, a dielectric filter, a dielectric duplexer or a communication unit, good properties can be realized for each of them.

What is claimed is:

1. A dielectric ceramic for high frequency having a composition represented by the formula:

$yCaTi_aO_{1+2a}-(1-y)xCa\{(Mg_zZn_{1-z})_{1/3}Nb_{2/3}\}_bO_{1+2b}-(1-y)(1-x)Ca(Al_{1/2}Nb_{1/2})_cO_{1+2c}$ wherein x and y are moles;
$\alpha=(1-y)x$;
$\alpha \leq 0.340$;
$0 < x \leq 0.600$;
$0.380 \leq y \leq 0.570$;
$0 \leq z \leq 1.000$;
$0.980 \leq a \leq 1.050$;
$0.980 \leq b \leq 1.050$; and
$0.980 \leq c \leq 1.050$; and
and wherein the main crystal phase comprises a perovskite crystal phase.

2. A dielectric ceramic for high frequency according to claim 1, further comprising Ta element, and having the composition represented by the formula:

$YCaTi_aO_{1+2a}-(1-y)xCa\{(Mg_zZn_{1-z})_{1/3}(Nb_dTa_{1-d})_{2/3}\}_bO_{1+2b}-(1-y)(1-x)Ca\{Al_{1/2}(Nb_dTa_{1-d})_{1/2}\}_cO_{1+2c}$ wherein $0 < d < 1.000$.

3. A dielectric ceramic for high frequency according to claim 2, wherein $1.000 \leq a \leq 1.050$; and $0.980 \leq b \leq 1.000$.

4. A dielectric resonator comprising a dielectric ceramic and input/output terminals electromagnetically coupled with the dielectric ceramic, wherein the dielectric ceramic is a dielectric ceramic for high frequency according to claim 3.

5. A dielectric filter comprising an outer coupler in combination with a dielectric resonator according to claim 4.

6. A dielectric duplexer comprising at least two dielectric filters, input/output connectors connected to each of said dielectric filters, and an antenna connector connected commonly to said dielectric filters, wherein at least one of said dielectric filters is a dielectric filter according to claim 5.

7. A communication unit comprising a dielectric duplexer according to claim 6, a transmission circuit connected to at least one of the input/output connectors of said dielectric duplexer, a receiving circuit connected to at least one input/output connectors which is different from said input/output connector connected to said transmission circuit, and an antenna connected to the antenna connector of said dielectric duplexer.

8. A dielectric resonator comprising a dielectric ceramic and input/output terminals electromagnetically coupled with the dielectric ceramic, wherein the dielectric ceramic is a dielectric ceramic for high frequency according to claim 2.

9. A dielectric filter comprising an outer coupler in combination with a dielectric resonator according to claim 8.

10. A dielectric duplexer comprising at least two dielectric filters, input/output connectors connected to each of said dielectric filters, and an antenna connector connected commonly to said dielectric filters, wherein at least one of said dielectric filters is a dielectric filter according to claim 9.

11. A communication unit comprising a dielectric duplexer according to claim 10, a transmission circuit connected to at least one of the input/output connectors of said dielectric duplexer, a receiving circuit connected to at least one input/output connectors which is different from said input/output connector connected to said transmission circuit, and an antenna connected to the antenna connector of said dielectric duplexer.

12. A dielectric ceramic for high frequency according to claim 1, wherein $1.000 \leq a \leq 1.050$; and $0.980 \leq b \leq 1.000$.

13. A dielectric resonator comprising a dielectric ceramic and input/output terminals electromagnetically coupled with the dielectric ceramic, wherein the dielectric ceramic is a dielectric ceramic for high frequency according to claim 12.

14. A dielectric filter comprising an outer coupler in combination with a dielectric resonator according to claim 13.

15. A dielectric duplexer comprising at least two dielectric filters, input/output connectors connected to each of said dielectric filters, and an antenna connector connected commonly to said dielectric filters, wherein at least one of said dielectric filters is a dielectric filter according to claim 14.

16. A communication unit comprising a dielectric duplexer according to claim 15, a transmission circuit connected to at least one of the input/output connectors of said dielectric duplexer, a receiving circuit connected to at least one input/output connectors which is different from said input/output connector connected to said transmission circuit, and an antenna connected to the antenna connector of said dielectric duplexer.

17. A dielectric resonator comprising a dielectric ceramic and input/output terminals electromagnetically coupled with the dielectric ceramic, wherein the dielectric ceramic is a dielectric ceramic for high frequency according to claim 1.

18. A dielectric filter comprising an outer coupler in combination with a dielectric resonator according to claim 17.

19. A dielectric duplexer comprising at least two dielectric filters, input/output connectors connected to each of said dielectric filters, and an antenna connector connected commonly to said dielectric filters, wherein at least one of said dielectric filters is a dielectric filter according to claim 18.

20. A communication unit comprising a dielectric duplexer according to claim 19, a transmission circuit connected to at least one of the input/output connectors of said dielectric duplexer, a receiving circuit connected to at least one input/output connectors which is different from said input/output connector connected to said transmission circuit, and an antenna connected to the antenna connector of said dielectric duplexer.

* * * * *